United States Patent [19]
Yamaguchi

[11] Patent Number: 5,513,052
[45] Date of Patent: Apr. 30, 1996

[54] BRAKE MECHANISM FOR TAPE PLAYER

[75] Inventor: Masato Yamaguchi, Kanagawa, Japan

[73] Assignee: Sony Corporation, Tokyo, Japan

[21] Appl. No.: 303,139

[22] Filed: Sep. 8, 1994

Related U.S. Application Data

[63] Continuation of Ser. No. 967,386, Oct. 27, 1992.

[30] Foreign Application Priority Data

Nov. 5, 1991 [JP] Japan .................................. 3-315166

[51] Int. Cl.$^6$ .................................................. G11B 5/027
[52] U.S. Cl. ........................................................ 360/85
[58] Field of Search ...................... 360/85, 95; 242/194, 242/197; 359/196, 213–214

[56] References Cited

U.S. PATENT DOCUMENTS

| | | | |
|---|---|---|---|
| 3,740,492 | 6/1973 | Inaga .................................. | 179/100.2 |
| 4,642,713 | 2/1987 | Ohira et al. ........................ | 360/85 |
| 4,961,120 | 10/1990 | Mototake et al. ................. | 360/85 |
| 5,216,558 | 6/1993 | Griffith et al. .................... | 360/99.06 |
| 5,321,565 | 6/1994 | Shibaike et al. .................. | 360/96.5 |

FOREIGN PATENT DOCUMENTS

| | | | |
|---|---|---|---|
| 146472 | 8/1984 | Japan .................................. | 360/95 |
| 5135456 | 6/1993 | Japan .................................. | 360/137 |

*Primary Examiner*—Robert S. Tupper
*Assistant Examiner*—Allen Cao
*Attorney, Agent, or Firm*—William S. Frommer; Alvin Sinderbrand

[57] ABSTRACT

A braking mechanism for use with a tape recorder and reproducer machine including a first chassis having a rotatable head drum provided thereon, and a second chassis connected to the first chassis for sliding movement with respect to the first chassis between first and second positions. The second chassis has a cassette chamber including spool tables for receipt of a tape cassette at the first position of the second chassis. The head drum carries a plurality of heads operable at the second position of the second chassis for recording a signal onto a cassette-type magnetic tape and reproducing a signal from a cassette-type magnetic tape. The brake mechanism comprises a rotary member drivingly associated with one of the spool tables. The rotary member has a brake drum secured thereon. A resilient brake arm is fixed at its one end on the first chassis and provided at the other end thereof with a brake shoe. The brake drum comes into resilient contact with the brake shoe to apply braking to the one spool table with movement of the second chassis to the second position.

4 Claims, 8 Drawing Sheets

BRAKE MECHANISM FOR TAPE PLAYER

This application is a continuation of application Ser. No. 07/967,386, filed Oct. 27, 1992.

BACKGROUND OF THE INVENTION

This invention relates to a brake mechanism for a tape recorder and reproducer machine including a first chassis having a rotatable head drum provided thereon, and a second chassis connected to the first chassis for sliding movement with respect to the first chassis between first and second positions, the second chassis having a cassette chamber including spool tables for receipt of a tape cassette at the first position of the second chassis.

In video or digital audio tape recorder and reproducer machines, it is desirable to use a brake arm for applying braking to lock the spool table or to provide a back tension to the magnetic tape. However, a complex, inexpensive and space-consuming mechanism is required to control the brake arm at an appropriate position. This results in a complex, expensive and space-consuming tape player.

SUMMARY OF THE INVENTION

Therefore, it is a main object of the invention to provide a compact, simple and inexpensive brake mechanism which can reduce the size of a tape player in which the brake mechanism is used.

There is provided, in accordance with the invention, a braking mechanism for use with a tape recorder and reproducer machine including a first chassis having a rotatable head drum provided thereon, and a second chassis connected to the first chassis for sliding movement with respect to the first chassis between first and second positions. The second chassis has a cassette chamber including spool tables for receipt of a tape cassette at the first position of the second chassis. The head drum carries a plurality of heads operable at the second position of the second chassis for recording a signal onto a cassette-type magnetic tape and reproducing a signal from a cassette-type magnetic tape. The brake mechanism comprises a rotary member drivingly associated with one of the spool tables. The rotary member has a brake drum secured thereon. A resilient brake arm is fixed at its one end on the first chassis and provided at the other end thereof with a brake shoe. The brake drum comes into resilient contact with the brake shoe to apply braking to the one spool table with movement of the second chassis to the second position.

BRIEF DESCRIPTION OF THE DRAWINGS

This invention will be described in detail by reference to the following description taken in connection with the accompanying drawings, in which.

DETAILED DESCRIPTION OF THE INVENTION

Figure 2:
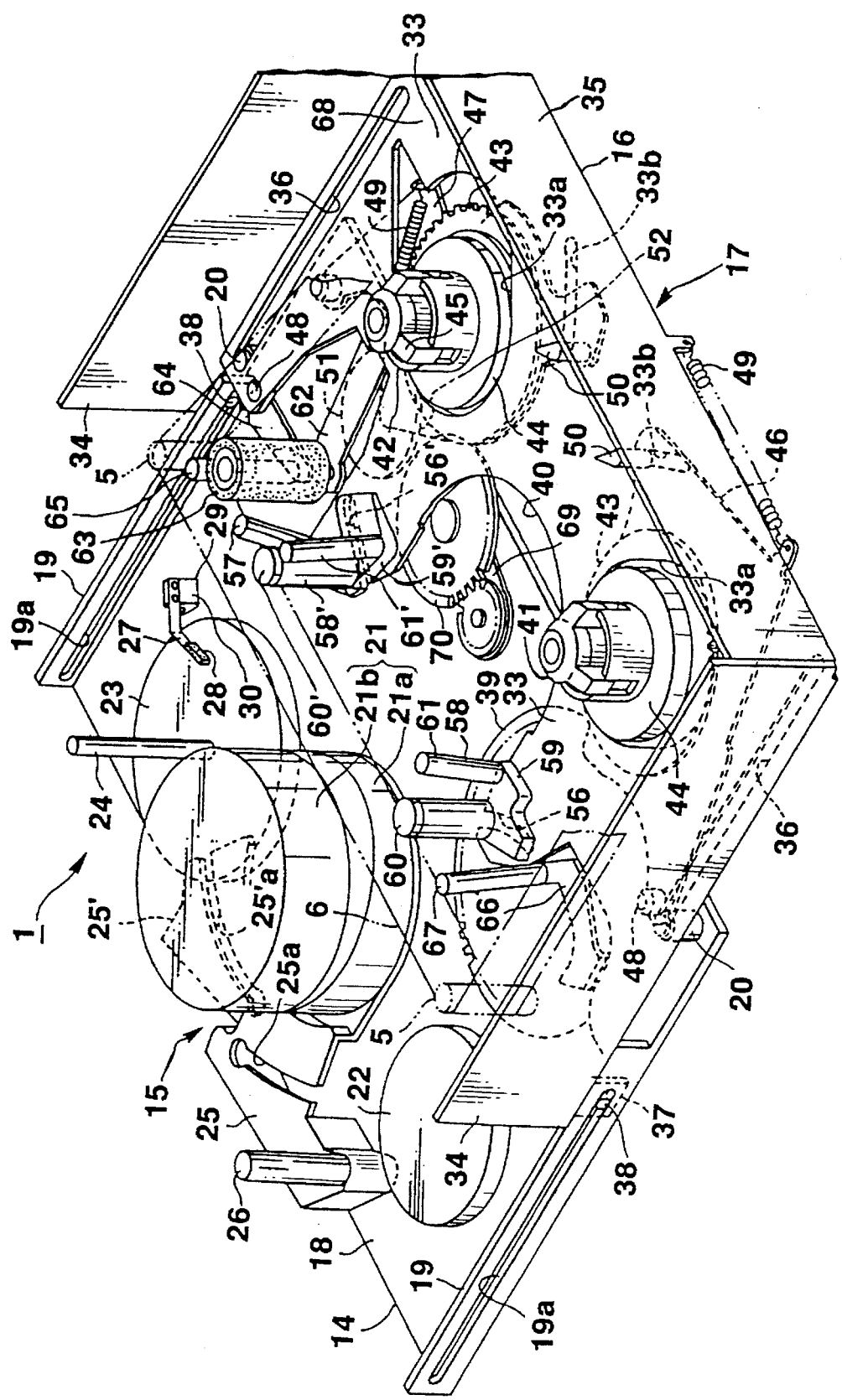
FIG. 2 is a perspective view showing the tape recorder and reproducer machine of the invention with the movable chassis in the extruded position.
Figure 3:
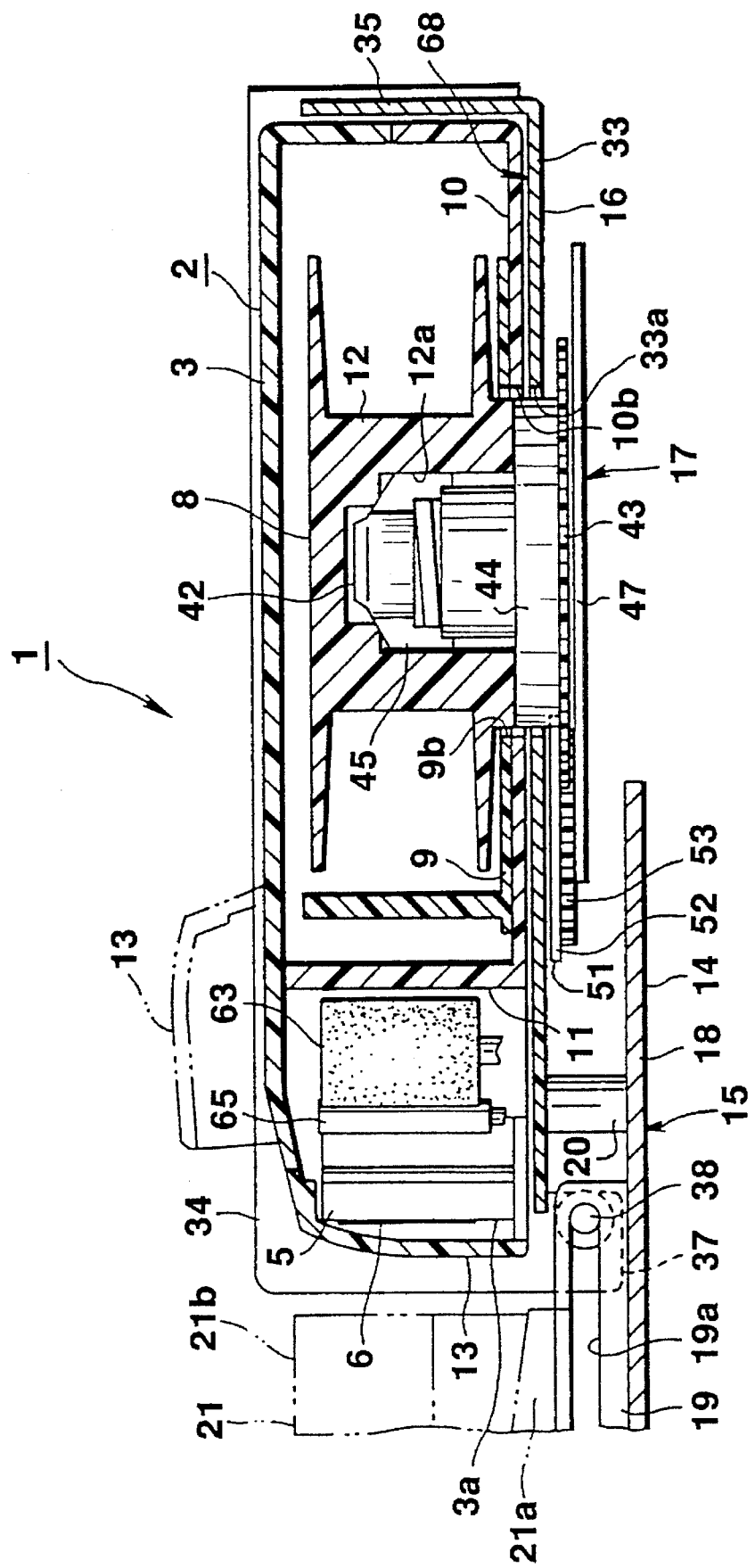
FIG. 3 is an enlarged sectional view taken along the line III—III of FIG. 1.
Figure 4:
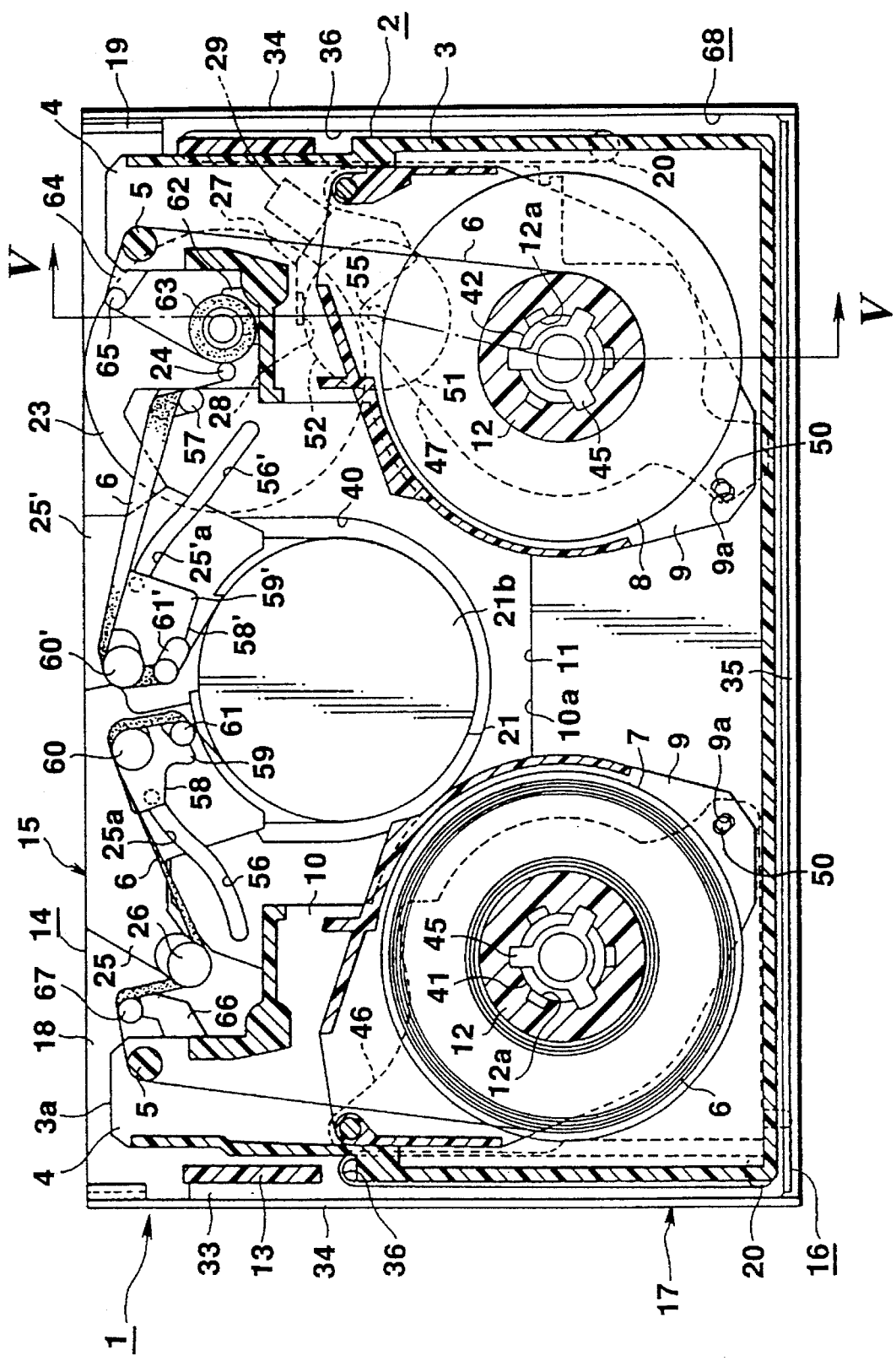
FIG. 4 is an enlarged plan view of the tape recorder and reproducer machine of the invention with the movable chassis in the retracted position.

With reference to the drawings, wherein like numerals refer to like parts in the several views, and in particular to FIGS. 1 through 5, there is shown a tape recorder and reproducer machine embodying the invention. The tape recorder and reproducer machine, generally designated by the numeral 1, will be described in connection with an 8 mm video tape cassette 2. The tape cassette 2 comprises a two-part cassette casing 3 which is composed of two interconnected rectangular casing parts. The cassette casing 3 is formed in its front edge 3a with tape ports 4 each of which has a guide pole 5 extending between the two casing parts for guiding a magnetic tape 6. The cassette casing 3 has a bottom plate 10 for supporting first and second spools 7 and 8 on which the magnetic tape 6 is wound. The bottom plate 10 has a trapezoid cutout 10a and two elongated spool holes 10b. The first and second spools 7 and 8 are supported on respective spool support plates 9. Each of the spool support plates 9, which is pivoted at its one end to the bottom plate 10 and formed at the other end thereof with an elongated hole 9a, has a circular spool hole 9b. The first spool 7 is supported rotatably on the first spool support plate 9 with its lower end placed in the circular spool hole 9b of the first spool support plate 9. The lower end of the first spool 7 extends outward through the first elongated spool hole 10b of the bottom plate 10. Similarly, the second spool 8 is supported rotatably on the second speed support plate 9 with its lower end placed in the circular spool hole 9b of the second spool support plate 9. The lower end of the second spool 7 extends outward through the second elongated spool hole 10b of the bottom plate 10. The first and second spool support plates 9 are rotated between first and second positions. At the first position of the first and second spool support plates 9, the first and second spools 7 and 8 are spaced at a standard distance predetermined for 8 mm video tape cassettes. At the second position, as shown in FIG. 4, the distance between the first and second spools 7 and 8 is somewhat longer than the standard distance.

The tape cassette 2 has a pivotal door 13 secured to the cassette casing 3 for rotation between a closed position, as indicated by the full lines of FIG. 3, and an open position, as indicated by the two-dotted lines of FIG. 3. The pivotal door 13 covers the front edge 3a of the cassette casing 3 at its closed or full line position and uncovers the front edge 3a of the cassette casing 3 so as to allow access to the magnetic tape 6 at its open or two-dotted line position. The pivotal door 13 is urged and held at its closed position by resilient means (not shown). When the tape cassette 2 is placed in the tape recorder and reproducer machine 1, the pivotal door 13 is at the closed position to cover the front edge 3a of the cassette casing 3 and the first and second spools 7 and 8 are at the standard positions. The tape recorder and reproducer machine 1 includes a door opening mechanism (not shown) for moving the pivotable door 13 to its open position against the force of the resilient means.

The tape recorder and reproducer machine 1 comprises a fixed section 15 and a movable section 17. The fixed section 15 includes a fixed chassis 14 larger than the tape cassette 2. The movable section 17 includes a slidable chassis 16 supported on the fixed chassis 14 for sliding movement with respect to the fixed chassis 14. The fixed chassis 14 has a flat portion 18 and turned side portions 19 each of which has a guide slot 19a extending in the horizontal direction and a pair of guide poles 20 extending upward therefrom (FIG. 2). The guide poles 20 have a length about one-third of the height of the tape cassette 2. The fixed chassis 14 supports a head drum 21 comprised of a pair of cylindrical-shaped drums 21a and 21b. The lower drum 21a is rigidly affixed to the flat portion 18 of the fixed chassis 14, and the upper drum 21b is rotatably supported on the lower drum 21a. A plurality of record/playback heads (not shown) are mounted on the lower portion of the upper drum 21b. The record/playback heads move along the outer peripheral surface of the head drum 21 with respect to the lower drum 21a with rotation of the upper drum 21b effectuated by a drive motor (not shown) during recording or playback. The fixed chassis 14 supports a main motor 22 on one side of the head drum 21 and a capstan motor 23 on the other side of the head drum 21. The capstan motor 23 has a capstan 24 extending upward therefrom. The numerals 25 and 25' designate a pair of guide members for guiding respective tape loading blocks 58 and 58' to be described later. The guide members 25 and 25' are inclined at an angle with respect to the fixed chassis 14 and positioned substantially in contact with the rear side of the head drum 21.

Figure 7:
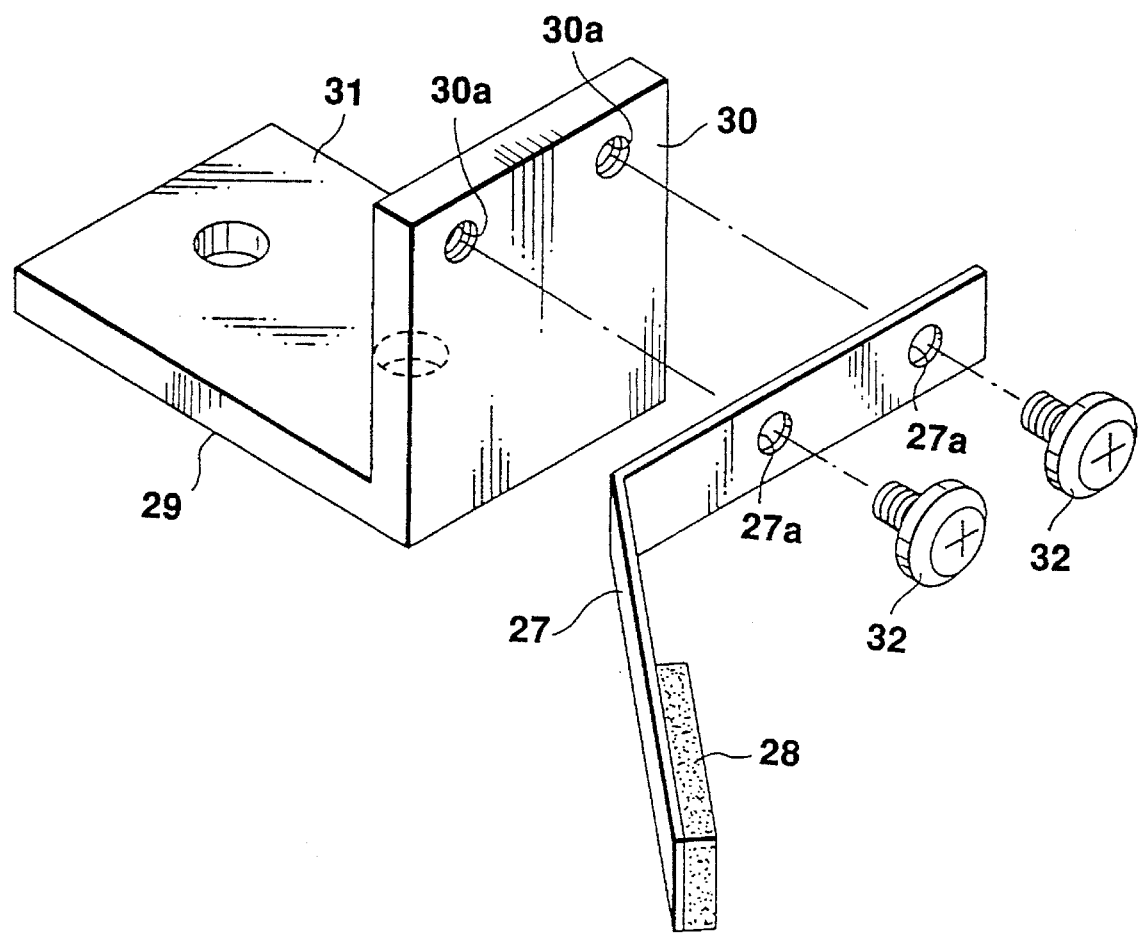
FIG. 7 is an enlarged perspective view showing the brake arm of the brake mechanism of FIG. 6.

The numeral 27 designates a brake arm adapted to come into resilient contact with a reel or spool table 42 for application of soft braking, that is, a light load to the reel table 42. The brake arm 27 is shown in the form of a bent resilient metal plate having a root portion bolted on an L-shaped arm support member 29 and a free end portion. As best shown in FIG. 7, the root portion of the brake arm 27 is formed with bolts holes 27a through which bolts 32 extends. The arm support member 29 has a vertical portion 30 formed with internally threaded bolt holes 30a and a horizontal portion 31 fixed on the fixed chassis 14 near the capstan motor 23. Bolts 32 extends through the respective bolt holes 27a and threadably engage with the respective internally threaded holes 30a. Thus, the brake arm 27 is at a position somewhat higher than the flat plate 18 of the fixed chassis 14. A brake shoe 28, which is made of felt or the like having a high friction factor, is fixed on the front surface of the free end portion of the brake arm 27.

Figure 1:
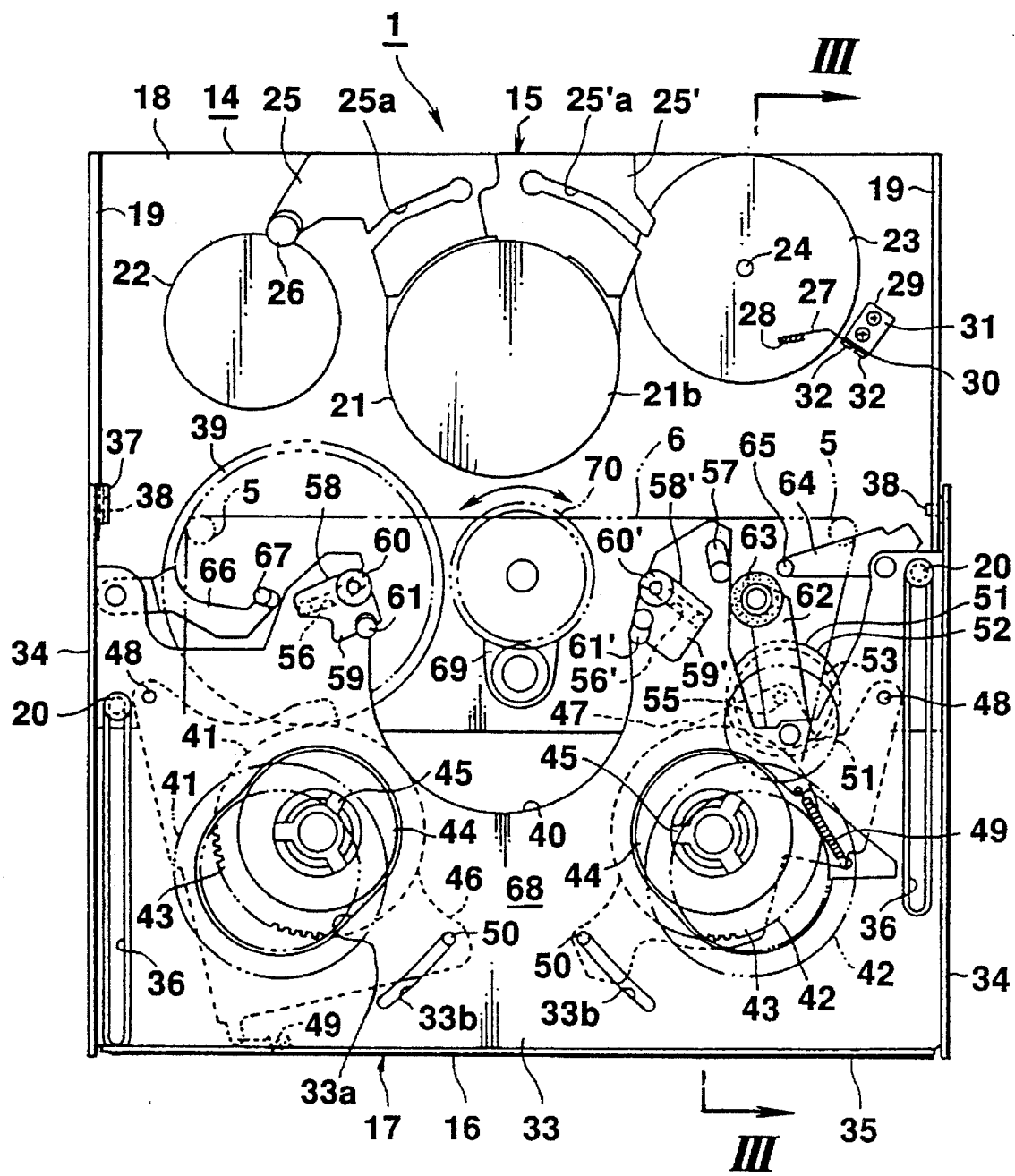
FIG. 1 is a plan view showing one embodiment of a tape recorder and reproducer machine made in accordance with the invention.
Figure 5:
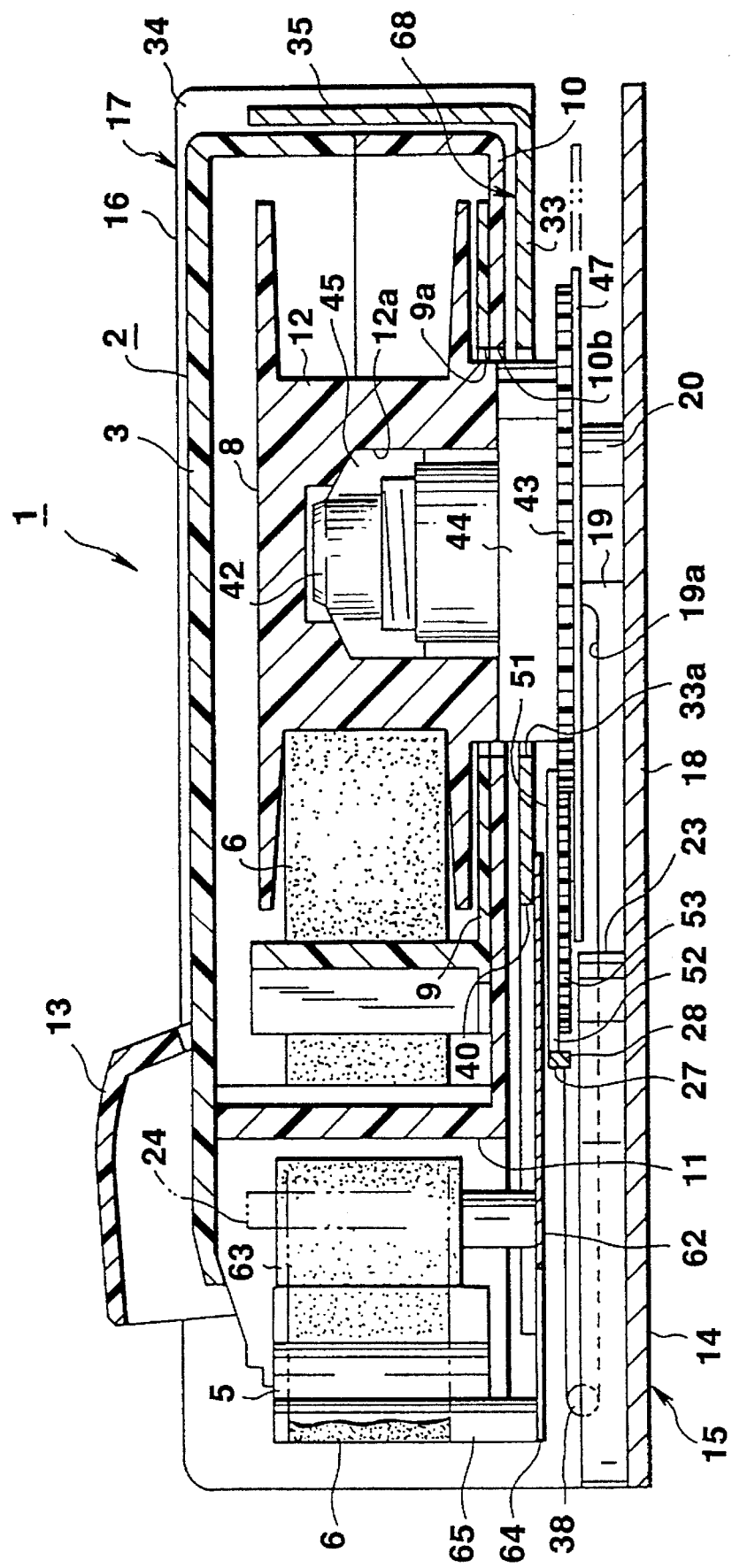
FIG. 5 is an enlarged side view partly in section showing the significant portion of the tape recorder and reproducer machine of the invention.
Figure 6:
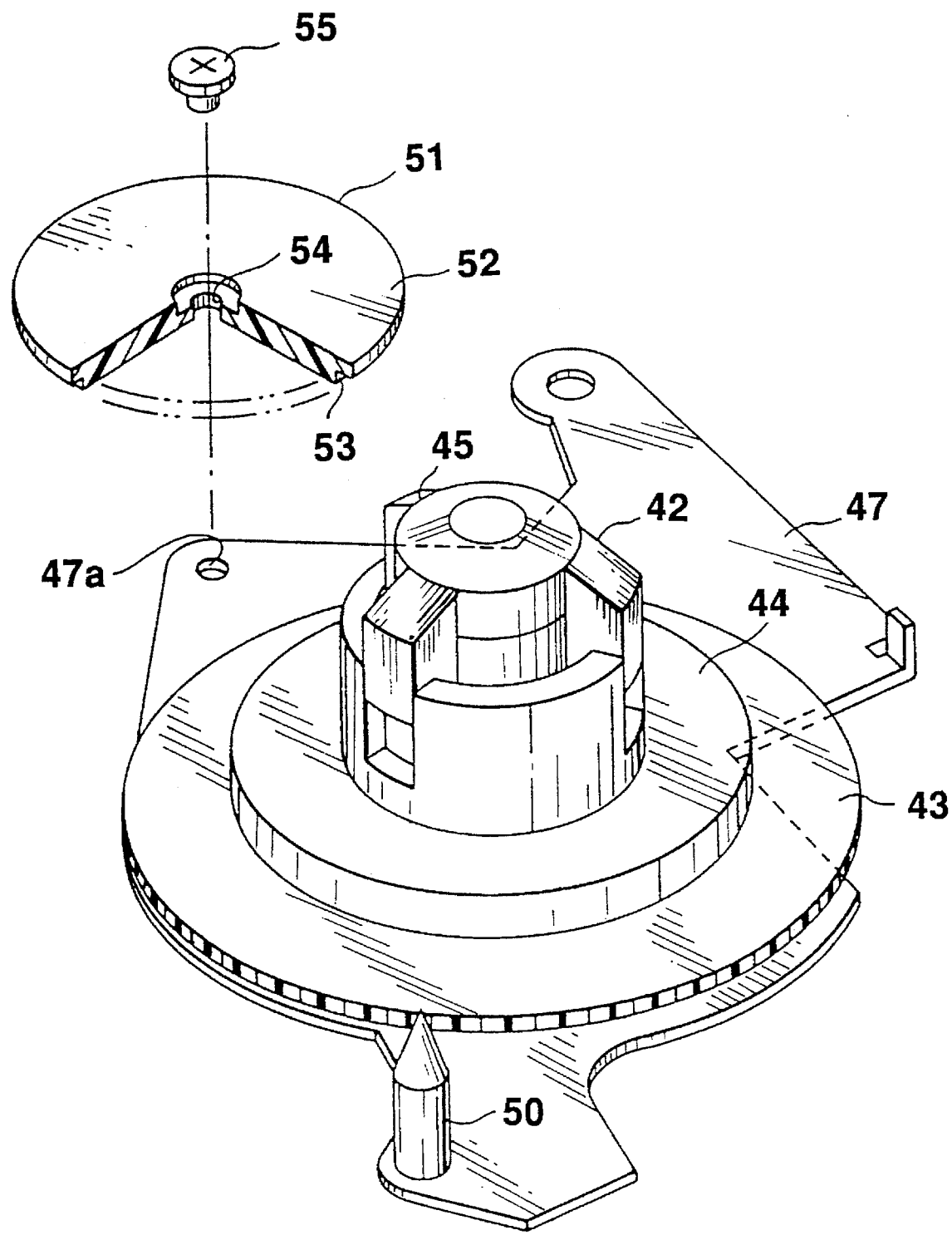
FIG. 6 is an enlarged perspective view showing the brake mechanism of the invention.

The slidable chassis 16 has a flat portion 33 supported for sliding movement with respect to the fixed chassis 14 at a position somewhat higher than the flat portion 18 of the fixed chassis 14. For this purpose, the slidable chassis 16 has upturned side portions 34, 34 and an upturned front portion 35. The upturned portions 34, 34 and 35 have a height substantially equal to the height of the tape cassette 2 for defining a cassette chamber adapted to receive the cassette 2. The flat portion 33 of the slidable chassis 16 is formed near its opposite side edges with guide slots 36 in which the respective poles 20 are inserted slidably. Each of the turned side portions 34 has a leg 37 extending downward therefrom. The leg 37 has a pin 38 inserted slidably in the guide slot 19a. The slidable chassis 16 is supported for sliding movement with respect to the fixed chassis 14 between retracted and extended positions. At the extended position, the slidable chassis 16 is extended from the fixed chassis 14, as shown in FIGS. 1, 2 and 3. At the retracted position, the slidable chassis 16 is retracted into the fixed chassis 14, as shown in FIGS. 4 and 5. Movement of the slidable chassis 16 is effectuated by an unshown drive mechanism including a cam gear 39.

The slidable chassis is formed in its flat portion 33 with a U-shaped cutout 40 in which the head drum 21 is placed when the slidable chassis 16 is in its retracted position, as shown in FIG. 4. The first and second spools 7 and 8 are supported on first and second spool tables 41 and 42, respectively. The first spool table 41 has a spur gear portion 43, a disc-shaped spool support portion 44 positioned at a height somewhat higher than the height of the spur gear portion 43, and a center shaft portion 45 extending upward from the support portion 44 for engagement with the first spool 7. The first spool table 41 is mounted on a first lever 46 with the spool support portion 44 being positioned above the flat portion 33 of the slidable chassis 16. The first lever 46 is pivoted at its one end on the flat portion 33 of the slidable chassis 16, as at 48 on FIG. 1, and provided at the other end thereof with a pin 50 inserted slidably in an arched guide groove 33b formed in the flat portion 23 of the slidable chassis 16 so that the first lever 46 can move the first spool table 41 between the first and second positions. A tension spring 49 is provided between the first lever 46 and the slidable chassis 16 to urge the first lever 46 toward the first position, as shown in FIG. 1. Rotation of the first lever 46 is effectuated by the drive mechanism including the cam gear 39. The second spool table 42 has a spur gear portion 43, a disc-shaped spool support portion 44 positioned at a height somewhat higher than the height of the spur gear portion 43, and a center shaft portion 45 extending upward from the support portion 44 for engagement with the second spool 8. The second spool table 42 is mounted on a second lever 47 with the spool support portion 44 being positioned above the flat portion 33 of the slidable chassis 16. The second lever 47 is pivoted at its one end, as at 48 on FIG. 1, on the flat portion 33 of the slidable chassis 16 and provided at the other end thereof with a pin 50 inserted slidably in an arched guide groove 33b formed in the flat portion 33 of the slidable chassis 16 so that the second lever 47 can move the second spool table 42 between the first and second positions. A tension spring 49 is provided between the second lever 47 and the slidable chassis 16 to urge the second lever 47 toward the first position, as shown in FIG. 1. Rotation of the second lever 47 is effectuated by the drive mechanism including the cam gear 39. The first and second levers 46 and 47 are positioned at a height somewhat lower than the flat portion 33 of the slidable chassis 16.

Figure 8:
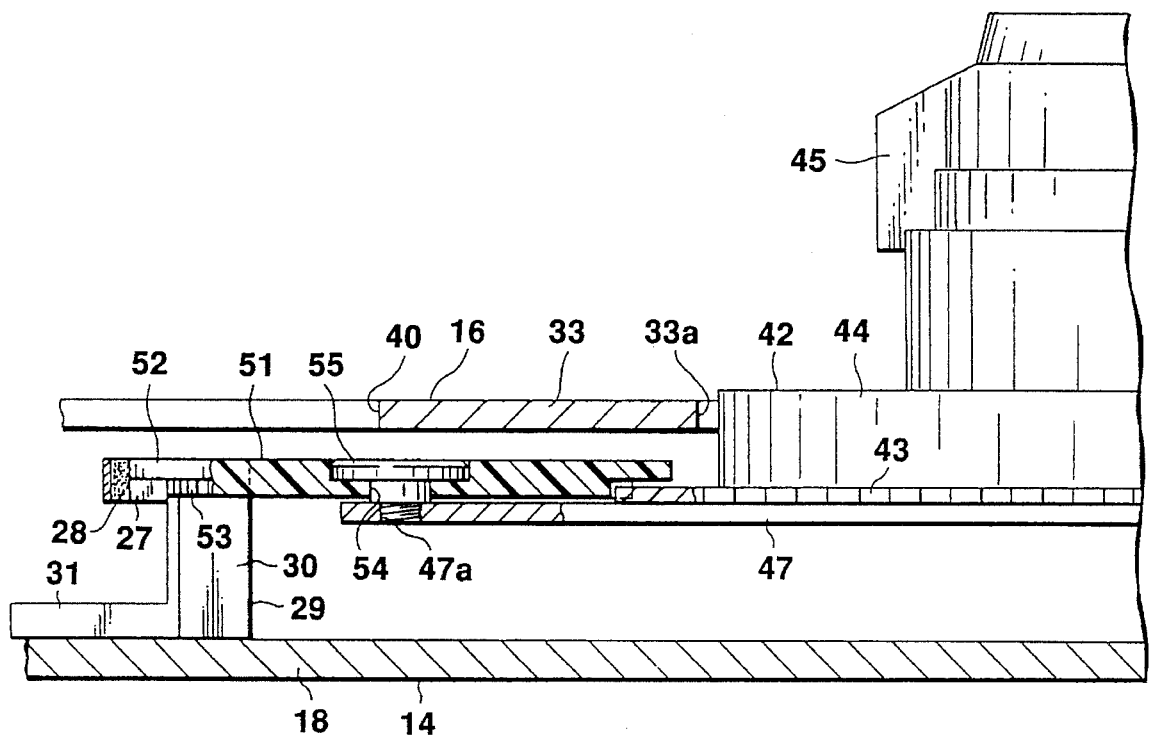
FIG. 8 is an enlarged side view in section showing the significant portion of the brake mechanism of FIG. 6.

The numeral 51 designates a drum gear supported at the rear end of the second lever 47. The drum gear 51 has a thin disc-shaped brake drum portion 52 and a spur gear portion 53 formed as a unit with the lower surface of the brake drum portion 52. The spur gear portion 53 has a diameter somewhat smaller than the diameter of the brake drum portion 52 and substantially equal to one-half of the diameter of the gear portions 43 and 43 of the first and second spool tables 41 and 42. A stepped bolt 55 extends through a hole 54 formed at the center of the drum gear 51. The stepped bolt 55 has an externally threaded portion threadable with an internally threaded hole 47a (FIG. 8) so that the drum gear 51 is held in mesh engagement with the spur gear portion 43 of the second spool table 42. The brake shoe 28 fixed on the brake arm 2 7 is positioned substantially at the same height as the brake drum portion 52 of the drum gear 51.

The flat portion 33 of the slidable chassis 16 is formed, at one side of the cutout 40, with a guide slot 56 having an open end and, at the other side of the cutout 40, with a guide groove 56' having an open end. An inclined guide pole 57 is fixed on the flat portion 33 of the slidable chassis 16 near the guide groove 56'. First and second type loading blocks 58 and 58' are supported slidably on the flat portion 33 of the slidable chassis 16 with pins being held in engagement with the respective guide slots 56 and 56'. The first tape loading block 58 has a movable base 59, a guide roller 60 supported by the movable base 59 and an inclined movable guide 61. The second tape loading block 59' has a movable base 59', a guide roller 60' supported by the movable base 59' and an inclined movable guide 56'. Three arms 62, 64 and 66 are rotatably mounted on the slidable chassis 16. The first arm 62 has a pinch roller 63 rotatably mounted at its free end. The second arm 64 has a guide 65 mounted at its free end. The third arm 66 has a pin 67 mounted at its free end. At the extended position of the slidable chassis 16, these arms 62, 64 and 66 are positioned as shown in FIG. 1. The tape cassette 2 is placed, from above in a cassette chamber 68 which is defined by the flat portion 33 and upstanding portions 34 and 35 of the slidable chassis 16 and which contains the first and second spool tables 41 and 42. The tape cassette 2 is loaded in to or discharged from the tape recorder 1 when the slidable chassis 16 is in its extended position. When the tape cassette 2 is placed in the cassette chamber 68, the center shaft portions 45 of the first and second spool tables 41 and 42 are inserted into the center bores 12a formed in the hubs 12 of the first and second spools 7 and 8, respectively, so that the first spool 7 can rotate in unison with the first spool table 41 and the second spool 8 can rotate in unison with the second spool table 42. When the slidable chassis 16 is in its extended position, the brake arm 27 is held out of contact with the drum gear 51 so as to release the soft braking action from the second spool table 42 with which the drum gear 51 engages. Therefore, the center shaft portions 45 can be positioned in place automatically when the center shaft portions 45 are inserted into the respective center holes 12a.

Connection pins 50 are inserted in the elongated holes 9a of the respective spool support plates 9 so that the first lever 46 can move in unison with the first spool support plate 9 on which the first spool 7 is supported and the second lever 47 can move in unison with the second spool support plate 9 on which the second spool 8 is supported. When the tape cassette 2 is placed in the cassette chamber 68, the guide rollers 60 and 60', the inclined movable guides 61 and 61', the pinch roller 63, the guide 65 and the pin 67 are placed inside of the magnetic tape 6 extending along the front edge 3a of the cassette casing 3, as shown in FIGS. 1 and 2. The pivotal door 13 of the tape cassette 2 moves to its open position with the movement of the cover (not shown) to close the upper surface of the cassette chamber 68. When this cover is closed, the cassette casing 3 comes into pressure contact with the upper surface of the flat portion 33 of the slidable chassis 16.

When a command is produced to retract the slidable chassis 16, the slidable chassis 16 is moved toward its retracted position after the first and second levers 46 and 47 are moved, along with the respective spool support plates 9, to the second position (FIG. 4) where the distance between the first and second spools 7 and 8 is made somewhat greater than the distance standardized for 8 mm video tape cassettes. By this movement, the head drum 21 can be inserted into the mouth portion 11 of the cassette casing 3 with the front portion of the drum periphery being placed between the first and second spools 7 and 8. The head drum 21 pushes the magnetic tape 6 extending across the front of the cassette casing 3 so that a predetermined length of the magnetic tape 6 is transported around the head drum 21, the guide rollers 60 and 60', the fixed tape guide 26, the inclined guide 57 and the capstan 24. Just before the slidable chassis 16 arrives at its retracted position, the outer peripheral surface of the brake drum portion 52 of the drum gear 51 comes into contact with the brake shoe 28 of the brake arm 27 so as to push the left end portion of the brake arm 27 rearward. When the slidable chassis 16 arrives at its retracted position, the left end portion of the brake arm 27 is in slight resilient contact with the brake drum portion 52 of the drum gear 51 through the brake shoe 28 to apply soft braking to the second spool table 42. Since the application of soft braking to the second spool table 42 occurs at such time, the spool 8 can rotate under the tension of the magnetic tape 6 to transport the magnetic taped with ease when the head drum 21 is inserted into the cassette casing 3.

When the slidable chassis 16 arrives at its retracted position, the left guide slot 56 formed in the slidable chassis 16 is aligned with the guide slot 25a formed in the left guide member 25 provided on the fixed chassis 14 and the right guide slot 56' of the slidable chassis 16 is aligned with the guide slot 25' a formed in the right guide member 25'. This permits the left loading block 58 to move along the guide grooves 56a–25a to a loading position behind the head drum 21 and the right loading block 58' to move along the guide grooves 56'–25' a to a loading position behind the head drum 21. When the slidable chassis 16 starts moving toward the retracted position, the arm 64 is rotated, by means of a guide cam (not shown) provided on the fixed chassis 14, to loop the magnetic taped around the guide 65. The arm 66 is released from its initial position to urge the pin 67 into resilient contact with the magnetic tape 6 under the resilient force of a tension spring (not shown). An appropriate tension is applied to the magnetic tape 6 under the force thus applied to the pin 67. A cam mechanism (not shown) is actuated to rotate the pinch roller 62 to push the magnetic tape 6 against the capstan 24 substantially at the same time when the slidable chassis 16 arrives at its retracted position. When the tape loading is completed, the magnetic tape 6 is transported from the first spool 7 to the second spool 8 around the left guide 5, the pin 67, the fixed tape guide 26, the guide roller 60, the inclined movable guide 61, the head drum 21, the inclined movable guide 61', the guide roller 60', the inclined fixed guide 57, the capstan 24, the guide 65, and the right guide 5 in this order. The magnetic tape 6 is transported by the capstan 24, the pinch roller 63 and the head drum 21.

The numeral 69 designates a swinging lever provided substantially at the center of the flat portion 18 of the fixed chassis 14. The swinging lever 69 has a idle gear 70 to which the rotation of the capstan motor 23 is transmitted. The idler gear 70 is positioned between the gear portion 43 of the first spool table 41 and the gear portion 43 of the second spool table 42 when the slidable chassis 16 moves to its retracted position. When the magnetic tape 6 is transported in a normal direction from the first spool 7 to the second spool 8, the idle gear 70 comes into masking engagement with the spur gear portion 43 of its second spool table 42 to rotate the second spool table 42 in the tape winding direction. When the magnetic tape 6 is transported in the reversed direction, that is, opposite to the normal direction, the idle gear 70 comes into masking engagement with the spur gear portion 43 of the first spool table 41 to rotate the first spool table 41 in the tape winding direction. Since the brake arm 27 provides soft braking, that is, an appropriate load, to the second spool table 42, the transportation of the magnetic tape 6 to the second spool 8 is suppressed in an appropriate manner to provide an appropriate back tension to the magnetic tape 6 so as to prevent the magnetic tape 6 from becoming slack between the first and second spools 7 and 8 when the magnetic tape 6 moves in the reversed direction. As soon as the transportation of the magnetic tape by the capstan 24 and the pinch roller 63 is terminated, the inertia force to rotate the second spool table 42 along with the second spool 8 will disappear so that the second spool table 42 can stop without overrunning. The pin 67 provides a back tension to the magnetic tape 6 when the magnetic tape 6 moves in the normal direction.

When the tape cassette 2 is to be discharged from the cassette chamber 68, the slidable chassis 16 is moved to its extended position and the magnetic tape 6 is unloaded. In this case, the slidable chassis 16 is moved to its extended position after the tape loading blocks 58 and 58' are moved toward the guide grooves 56 and 56' of the slide chassis 16. This movement causes the head drum 21 to be discharged from the mouth portion 11 of the tape cassette 2 and the pinch roller 63, the guide 65 and the pin 67 to be returned to their initial positions. At the same time as such of movement of the tape loading blocks 58 and 58', the first spool 7 or the second spool 8 is rotated to wind up the magnetic tape 6 therearound with no slack. Just after the slidable chassis 16 starts moving toward its extended position, the drum gear 51 separates from the brake arm 27.

While the invention has been described in connection with a tape recorder and reproducer machine standardized for 8 mm tape cassettes, it is to be understood that the invention is equally applied to tape recorder and reproducer machines standardized for other tapes and audio tapes. While the invention has been described in conjunction with a specific embodiment thereof, it is evident that many alternatives, modifications and variations will be apparent to those skilled in the art. Accordingly, it is intended to embrace all alternatives, modifications and variations that fall within the scope of the appended claims.

What is claimed is:

1. A recording and reproducing apparatus for use with a tape cassette including a generally rectangular casing having a mouth opening along a side of the casing, first and second rotatable reels spaced apart within the casing, a magnetic tape wound on said reels, and fixed tape guides in said casing for directing the tape between said reels in a run extending across said mouth, said apparatus comprising:

a fixed chassis;

a head drum rotatably mounted on said fixed chassis and carrying a plurality of heads for recording or reproducing a signal on a magnetic tape when the magnetic tape is wrapped about at least a portion of the circumference of said head drum;

a movable chassis having means thereon defining a cassette chamber dimensioned to receive said casing of the tape cassette and including rotatable first and second spool tables for engagement with said first and second reels of the tape cassette received in said cassette chamber;

means mounting said movable chassis for rectilinear sliding movements relative to said fixed chassis between a first position, in which said cassette chamber is relatively remote from said head drum for receiving or discharging said tape cassette, and a second position, in which said head drum extends into said mouth of the cassette casing in said chamber and deflectingly bears against said run of the tape extending thereacross for wrapping said tape about at least said portion of the circumference of the head drum;

a rotary member mounted rotatably on said movable chassis and being coupled with one of said spool tables so as to prevent relative rotation of said rotary member and said one spool table in respect to each other, said rotary member having a brake drum surface thereon;

a brake member including a resilient brake arm having one end fixed to said fixed chassis and another free end secured to a brake shoe, said brake arm being dimensioned and disposed so that, with said movable chassis in said first position, said brake shoe is spaced from said brake drum surface and, upon said sliding movement of the movable chassis toward said second position, said brake drum surface is urged against said brake shoe in opposition to a resisting force exerted by said resilient brake arm; and tape drive means including a rotatably driven capstan mounted on said fixed chassis, and a pinch roller rotatably mounted on said movable chassis for pressing said tape against said rotatably driven capstan when said movable chassis is in said second position so that said tape is then driven by said capstan against a soft braking action resulting from the urging of said brake drum surface against said brake shoe.

2. A recording and reproducing apparatus as in claim 1; in which said one spool table has a first spur gear portion, and said rotary member having said brake drum surface further includes a second spur gear portion meshing with said first spur gear portion.

3. A recording and reproducing apparatus as in claim 1; further comprising movable tape loading guides movable in response to said sliding movement of said movable chassis relative to said fixed chassis so that, with said movable chassis in said first position thereof, said tape loading guides extend into said mouth of the tape cassette in said chamber for engagement with the tape extending thereacross, and, upon said movement of said movable chassis to said second position thereof, said loading guides are moved in back of said head drum for withdrawing the tape from said casing and further wrapping the withdrawn tape about said head drum.

4. A recording and reproducing apparatus as in claim 3; in which said fixed chassis and movable chassis have respective grooves for directing movements of said tape loading guides and, in the course of said sliding movement of the movable chassis from said first position to said second position, said respective grooves come into alignment with each other to permit movements of said tape loading guides from said movable chassis onto said fixed chassis.

* * * * *